United States Patent [19]

Kelman et al.

[11] Patent Number: 5,660,908
[45] Date of Patent: Aug. 26, 1997

[54] RECYCLABLE AUTOMOTIVE HEADLINER AND METHOD OF MANUFACTURE

[75] Inventors: Josh Kelman, Dover; Richard D. Rhodes, Somersworth, both of N.H.

[73] Assignee: Davidson Textron Inc., Dover, N.H.

[21] Appl. No.: 620,167

[22] Filed: Mar. 22, 1996

[51] Int. Cl.$^6$ .................... B32B 1/04; B60J 7/00; B27N 3/10

[52] U.S. Cl. .................. 478/74; 428/156; 428/161; 428/167; 428/172; 428/182; 428/480; 296/214; 156/62.2; 156/244.25; 264/103; 264/119; 264/177.1; 264/257

[58] Field of Search .................... 428/167, 74, 172, 428/480, 161, 182, 288, 286, 903.3; 296/210, 214, 901; 264/257, 103, 119, 167, 177.1; 156/62.2, 244.25

[56] References Cited

U.S. PATENT DOCUMENTS

| | | | |
|---|---|---|---|
| 4,824,714 | 4/1989 | Gest | 428/156 |
| 4,840,832 | 6/1989 | Weinle et al. | 428/156 |
| 5,225,130 | 7/1993 | Deiringer | 264/102 |
| 5,275,865 | 1/1994 | Nicolay | 428/156 |

*Primary Examiner*—Donald Loney
*Attorney, Agent, or Firm*—Reising, Ethington, Barnard & Perry

[57] ABSTRACT

A recyclable automotive headliner consists 100% of polyethylene terephthalate (PET) material and includes reverse ribs of varying density of PET fibers filled with reinforcements of full density PET material. A method of manufacturing such headliners includes forming the reverse ribs in the PET fibers and either preforming the full density reinforcements and bonding them between the ribs or forming the ribs and then injecting molten full density PET material therebetween.

20 Claims, 2 Drawing Sheets

RECYCLABLE AUTOMOTIVE HEADLINER AND METHOD OF MANUFACTURE

TECHNICAL FIELD

This invention relates to an automotive headliner and, more particularly, to a recyclable headliner comprised of 100% polyethylene terephthalate (PET) material and its method of manufacture.

BACKGROUND OF THE INVENTION

Prior art headliner configurations include those with foam cores bonded to a fabric decorative sheet as Set forth in U.S. Pat. Nos. 3,966,526 and 4,211,590; those with a fiberglass or corrugated paper reinforcement as set forth in U.S. Pat. No. 4,119,749; and those that include a thermoformed polyester fiber core covered by a fabric layer or by a foam layer of differing material as set forth respectively in U.S. Pat. Nos. 4,840,832 and 5,275,865.

In all such cases the headliners are comprised of different materials that are difficult to recycle.

The headliner of the present invention is made 100% from PET material capable of recycling by processes such as set forth in U.S. Pat. No. 5,225,130. While the '130 patent describes a process for reclaiming scrap PET material it does not disclose or suggest a solution of how to provide a headliner of a 100% PET material that will have desired strength properties.

SUMMARY OF THE INVENTION

An object of the present invention is to provide a high strength automotive headliner that can be scrapped and recycled without separating the constituent parts thereof and to do so by an automotive headliner that consists 100% of PET material.

One feature of the present invention is to provide such an automotive headliner having a polymeric fiber batt of 100% PET material and including impressions forming reverse ribs of varying density of PET fibers filled with full density PET reinforcements.

Another feature of the present invention is to provide a method of manufacturing such headliners including forming the reverse ribs in the PET fibers by heating and compressing the PET fibers into a reverse rib configuration having ribs of varying density and either preforming the full density reinforcements and bonding them between the ribs or forming the ribs and then injecting molten full density PET material therebetween.

BRIEF DESCRIPTION OF THE DRAWINGS

These and other objects, features and advantages of the present invention will be better understood and apparent with reference to the following detailed description taken in conjunction with the accompanying drawings wherein.

DETAILED DESCRIPTION OF THE PREFERRED EMBODIMENT

Figure 1:
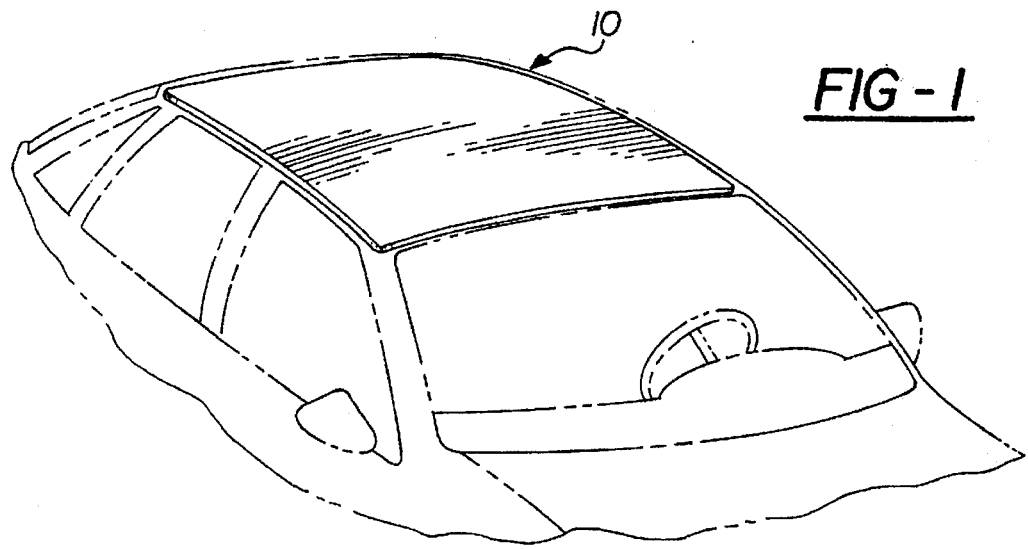
FIG. 1 is a partial perspective phantom view of a vehicle with a headliner including the present invention.

A headliner for mounting across the underside of an automotive passenger compartment roof is generally shown at 10 in FIG. 1. The headliner 10 comprises a polymeric fiber batt, as is generally indicated at 12 in FIG. 3. The batt 12 is made up of 100% polyethylene terephthalate (PET) fibers, about 10% of which are low-melt fibers. The batt 12 has a smooth, cosmetic front side 14 that faces downward into the passenger compartment and, as shown in FIGS. 2, 4, 5, 7 and 8, a back side 16 that faces upward toward the underside of the vehicle roof. The batt 12 is formed into a downwardly-opening concave configuration and is shaped to fit across and adjacent the underside of the roof.

Figure 2:
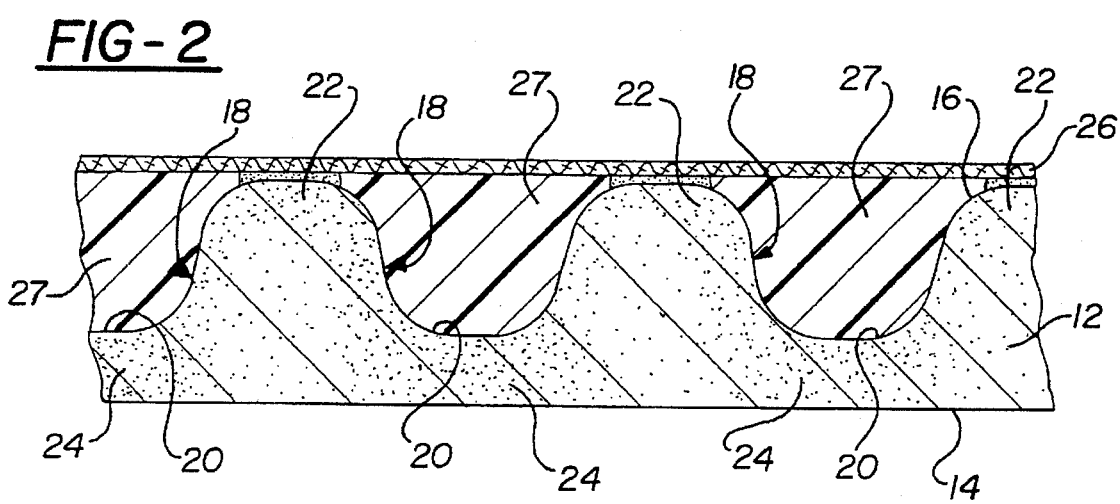
FIG. 2 is a detailed fragmentary cross-sectional view showing a headliner constructed in accordance with a first embodiment of the invention.
Figure 4:
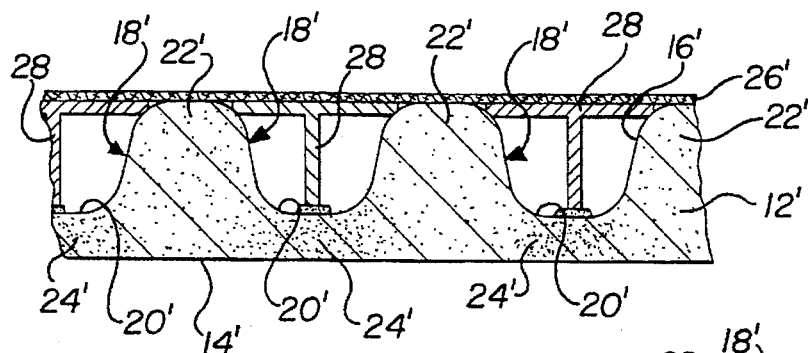
FIG. 4 is a view similar to FIG. 2 showing one variant of a second embodiment of the invention.
Figure 5:
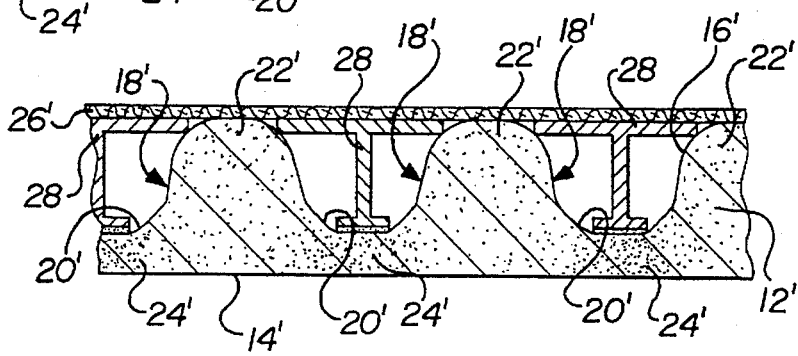
FIG. 5 is a view similar to FIG. 2 showing a second variant of the second embodiment.
Figure 6:
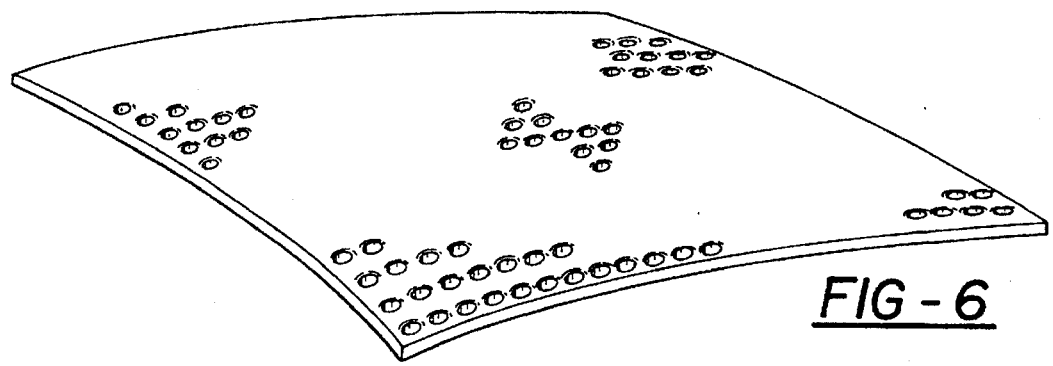
FIG. 6 is a view similar to FIG. 3 showing an alternative batt configuration.
Figure 7:
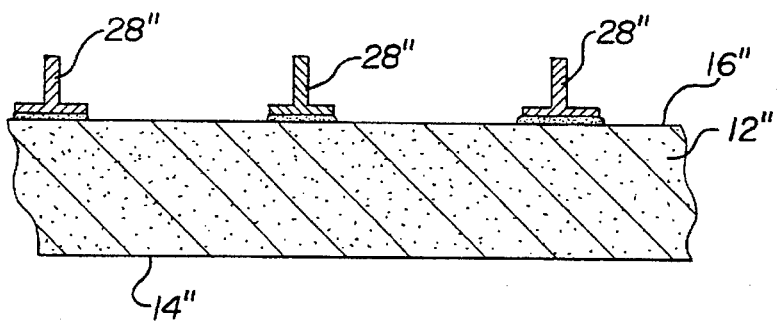
FIG. 7 is a view similar to FIG. 2 showing one variant of a third embodiment of the invention.
Figure 8:
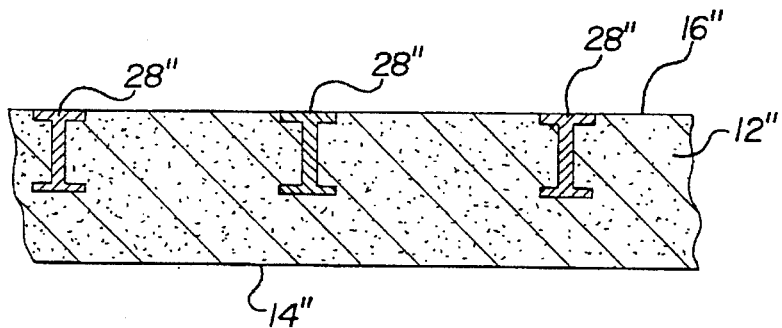
FIG. 8 is a view similar to FIG. 2 showing a second variant of the third embodiment.

A cross section of a headliner constructed according to a first embodiment of the invention is shown in FIG. 2. FIGS. 4 and 5 show two variants of a second embodiment of the invention and FIGS. 7 and 8 show two variants of a third embodiment. Reference numerals with the designation prime (') in FIGS. 4 and 5 and the designation double-prime (") in FIGS. 7 and 8 indicate alternative configurations of elements that also appear in the first embodiment. Portions of the following description use reference numerals to refer to elements in the figures. If a portion of the description includes a reference numeral having no prime or double-prime designation, we intend that portion of the description to apply equally to elements in FIGS. 1–8 that are indicated by that reference numeral—both with and without a prime or double-prime designation.

Figure 3:
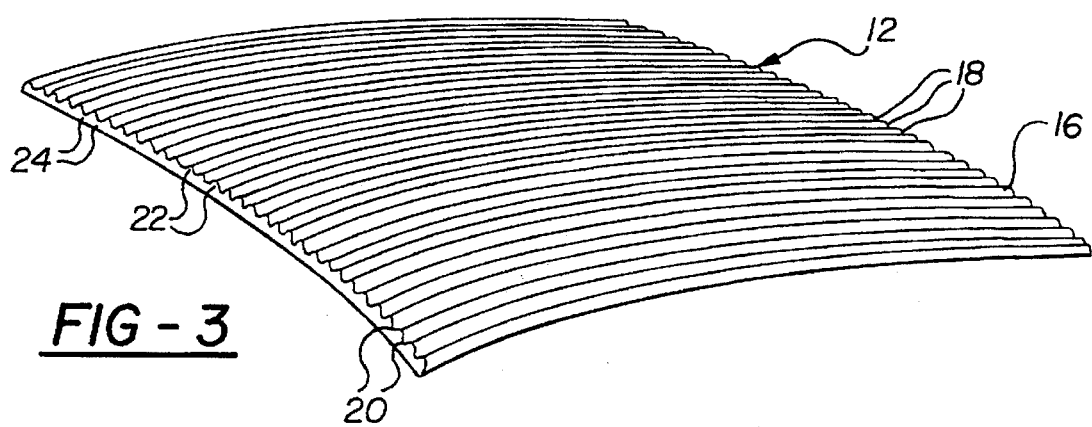
FIG. 3 is a perspective view of a fiber batt preformed according to the invention.

As shown in FIG. 3, the back side 16 of the batt of the first and second embodiments comprises a plurality of impressions in the form of corrugations 18, or "reverse ribs", that extend across the batt back side 16. The corrugations 18 comprise a plurality of corrugation channels 20 disposed between and defining corrugation ribs 22. Between the corrugations 18 and the batt front side 14 are areas 24 of reduced batt thickness and correspondingly higher batt fiber density that act as reinforcing elements and stiffen the headliner 10.

As shown in FIG. 2, the first embodiment of the invention includes a skin of coarse fabric, i.e., a "scrim" layer 26 made of PET fibers that is bonded to the batt back side 16 and lays flat across the back side 16, spanning the corrugations 18. By bonding the scrim layer 26 to the batt back side 16 in such a way that it spans the corrugations 18, the scrim 26 imparts additional stiffness and shape-retention properties to the headliner 10. The scrim 26 does this by structurally reinforcing and holding the shape of each corrugation 18 against bending forces that might be applied to the headliner 10. As is best shown in FIG. 2, the bonded scrim layer 26 "caps-off" each corrugation channel 20 to form an elongated trapezoidal "torsion box" structure that resists bending and twisting forces.

Full-density extruded PET 27 fills each corrugation channel 20 between the batt back side 16 and the scrim layer 26. The full-density extruded PET 27 is heat-bonded to the low-melt fibers in the batt 12. The parallel rows of elongated full-density extruded PET filler material 27 follow the general curvature of the headliner 10 and act as structural arches supporting the concave shape of the headliner 10 after installation.

While the first and second embodiments include corrugations 18 formed into the batt back side 16 as shown in FIG. 3, variants of the first and second embodiment may additionally or alternatively include corrugations formed in the batt front side 14. Within the scope of this invention, other variants may also include, in the place of corrugations 18, a plurality of closely-spaced craters that define an "egg-crate"-type surface across the batt back side or front side as shown in FIG. 6.

Also within the scope of the present invention, the skin spread across the batt back side 16 of the first embodiment may be made of a PET film instead of a scrim layer 26. In other variants, the full-density extruded PET filler material 27 may be bonded to the batt 12 by an adhesive rather than by heat fusion. The adhesive may be any one of a number of suitable adhesives to include PET adhesive.

Other variants may omit the full-density extruded PET filler 27 altogether. Instead, the spaces formed between the PET scrim 26 and the PET batt 12, where the scrim 26 spans the channels 20 in the batt back side 16, may be left empty.

In the second embodiment of the present invention shown in FIGS. 4 and 5, extruded PET beams 28 are bonded into and along each corrugation channel 20 between the PET batt 12 and the PET scrim layer 26. FIG. 4 shows the second embodiment with "T" beams and FIG. 5 shows "I" beams bonded into each corrugation channel 20. In the second embodiment, the extruded beams 28 take the place of the full-density extruded PET filler material of the first embodiment and serve the same purpose of providing stiffness and rigidity to the headliner 10.

As shown in FIGS. 7 and 8, the third embodiment uses the same type of full-density extruded PET beams 28 as in the second embodiment but the beams 28 are bonded to the flat back side 16 of a PET batt 12 that has no corrugations 18 or craters. The PET beams 28 may have any suitable cross-sectional shape to include T-shaped beams as shown in FIG. 7 and I-shaped beams as shown in FIG. 8. The beams 28 may also be either partially or completely imbedded in the batt 12 as shown in FIG. 8.

In practice, a polymeric fiber batt 12, preferably comprising 100% PET fibers (10% of which are low melt fibers), is heated until the low-melt fibers melt. The fiber batt 12 is then placed in a press where it is formed and compressed into a contoured shape.

Within the press, cold platens form a plurality of impressions into the fiber batt back side 16 resulting in a plurality of high-density areas 24 of PET located between the impressions and the batt front side 14. The impressions are formed as elongated corrugation channels 20 of PET that define and are disposed between elongated corrugation ribs 22 of PET. The fiber batt 12 is then cooled until the low-melt fibers solidify. A PET scrim 26 or film layer is then bonded to the batt back side 16 with the scrim layer 26 spanning the impressions.

Full density extruded PET 27 is then heated, melted and injected into each corrugation channel 20 until each channel 20 is full of the melted PET material 27. The full density extruded PET 27 may be injected either before or after the scrim layer 26 is applied. The full density PET 27 adheres to the channel walls by causing the low melt fibers in the batt 12 to melt and co-mingle with the molten full density PET 27. Upon cooling and hardening, the full density extruded PET 27 formed within each channel 20 becomes an integral stiffening and rigidifying beam.

To form craters rather than channels 20 across the batt backside, the press platens are shaped to form crater-shaped depressions. Where PET adhesive is used to bond the full-density extruded PET within the depressions, the adhesive is applied along each depression prior to injecting the molten PET.

The PET T or I beams 28 may be either partially or fully embedded in the batt 12 rather than being bonded to a batt surface. In this case, the beams 28 are molded into the batt 12 either before or during the time when the batt 12 is formed within the press.

By this process one may form a headliner which is light, inexpensive, and sufficient rigid to hold its shape while spanning a passenger compartment ceiling. The various rigidifying features incorporated into the headliner using this process allow headliners to be constructed using 100% recycled PET materials.

If desired, PET cloth material can be used as a cover surface or first surface on the headliner. Further, while PET is the preferred material for recycling the whole headliner, the invention contemplates replacement of PET with a polymer that would be compatible with PET when passed through a recycling process.

This is an illustrative description of the invention using words of description rather than of limitation.

Obviously, many modifications and variations of this invention are possible in light of the above teachings. Within the scope of the claims, one may practice the invention other than as described.

We claim:

1. A headliner consisting essentially of polyethylene terephthalate for mounting across the underside of an automotive passenger compartment roof, said headliner comprising:
   a fiber batt of polyethylene-terephthalate having a front side and a back side, said batt shaped to fit across and adjacent the underside of an automotive passenger compartment roof with said back side facing the underside, said back side comprising a plurality of impressions; and
   a skin of polyethylene terephthalate bonded to said back side, said skin laying flat across said back side and spanning said impressions to impart additional stiffness and shape-retention properties to said headliner.

2. A headliner as defined in claim 1 wherein said skin comprises a scrim layer.

3. A headliner as defined in claim 1 including full density extruded polyethylene terephthalate deposited within said impressions between said batt and said skin.

4. A headliner as defined in claim 1 wherein said impressions comprise a plurality of corrugations, said corrugations extending across said batt backside.

5. A headliner as defined in claim 4 wherein said corrugations have corrugation channels and where said headliner includes extruded beams disposed along said channels between said batt and said skin.

6. A headliner as defined in claim 1 wherein said impressions comprise a plurality of craters, said craters defining an "egg-crate" type surface across said batt backside.

7. A headliner as defined in claim 1 wherein said batt comprises low-melt fibers, and wherein areas of reduced batt thickness and higher batt fiber density are formed between said impression and said front side to stiffen said headliner.

8. A headliner consisting essentially of polyethylene terephthalate for mounting across the underside of an automotive passenger compartment roof, said headliner comprising:

a polymeric fiber batt of polyethylene terephthalate shaped to fit across and adjacent the underside of an automotive passenger compartment roof, said batt having a back side; and a plurality of reinforcing members of polyethylene terephthalate bonded to said batt back side to further stiffen said headliner and enhance shape retention.

9. A headliner as defined in claim 8 wherein said reinforcing members comprise extruded beams bonded to said batt.

10. A headliner as defined in claim 8 wherein said back side comprises a plurality of impressions, and where areas of reduced batt thickness and higher batt fiber density are formed between said impressions and said front side to stiffen said headliner.

11. A headliner as defined in claim 10 wherein said reinforcing members comprise full density extruded polyethylene terephthalate deposited within said impressions to bond with said batt.

12. A headliner as defined in claim 10 wherein said impressions comprise a plurality of corrugations, said corrugations extending across said batt back side.

13. A headliner as defined in claim 12 wherein said corrugations have corrugation channels disposed between and defining corrugation ribs and where said reinforcing members comprise a plurality of extruded beams bonded into and along said corrugation channels between said corrugation ribs.

14. A method for manufacturing an automotive headliner consisting essentially of polyethylene terephthalate comprising a batt of polyethylene terephthalate including low melt fibers, said method comprising the steps of:

heating the batt until the low-melt fibers melt;

forming and compressing the fiber batt into a contoured shape having a concave front side and a back side;

forming a plurality of impressions in the back side to create a plurality of high-density areas between the impressions and the front side;

cooling the fiber batt until the low-melt fibers solidify; and bonding at least one reinforcing member of polyethylene terephthalate to the back side of the batt.

15. A method as defined in claim 14 wherein said step of forming impressions includes the step of forming elongated corrugation channels that define and are disposed between elongated corrugation ribs.

16. A method as defined in claim 14 wherein said step of forming impressions includes the step of forming craters, said craters defining an "egg-crate"-type surface across said batt backside.

17. A method as defined in claim 14 wherein said step of bonding at least one reinforcing member to the batt includes the step of introducing full-density extruded polyethylene terephthalate into at least one of the impressions.

18. A method as defined in claim 17 wherein said step of introducing extruded polyethylene terephthalate into the impressions includes the step of heating the full-density extruded polyethylene terephthalate causing the heated polyester to melt and adhere to the low melt fibers in the batt.

19. A method as defined in claim 17 wherein said step of introducing extruded polyethylene terephthalate into the impressions includes the step of bonding the full-density extruded polyethylene terephthalate into the impressions using an adhesive.

20. A method as defined in claim 14 wherein said step of bonding at least one reinforcing member to the batt includes the step of bonding extruded beams to the batt.

* * * * *